United States Patent Office 2,802,851
Patented Aug. 13, 1957

2,802,851

TRIORGANOETHYNYL FLUOROSILANES

George L. Moore, South Plainfield, N. J., assignor to Air Reduction Company, Incorporated, New York, N. Y., a corporation of New York No Drawing. Application March 14, 1955, Serial No. 494,275

14 Claims. (Cl. 260—448.2)

This invention relates to certain novel triorganoethynyl fluorosilanes and to a method for preparing same.

More particularly, this invention is concerned with new compositions of matter which may be represented by the following structural formula $$(R-C\equiv C-)_3 SiF$$

wherein R is a hydrocarbon radical.

The hydrocarbon radical represented by R may be alkyl, alkenyl, aryl, or aralkyl. Alkyl groups having between one and about ten carbon atoms are preferred. The alkyl group may have a straight or branched chain, or may be cyclic, and may include such groups as methyl, ethyl, propyl, butyl, isobutyl, amyl, isoamyl, hexyl, cyclohexyl, and octyl. Included among the alkenyl radicals are vinyl and allyl. Such aryl radicals as phenyl, tolyl, xylyl, and naphthyl and such aralkyl groups as benzyl and phenethyl are included. Since the reagents methyl acetylene, phenyl acetylene, 1-hexyne, and vinyl acetylene are more readily obtainable and their products appear to be generally the most useful technically, those compounds in which R is methyl, phenyl, butyl, and vinyl are preferred.

While various organic silanes have been prepared and described in the prior art, the novel triorganoethynyl fluorosilanes of this invention are distinguished by the presence of three organoethynyl groups and a fluorine atom directly attached to the silicon atom which makes the compounds of this invention highly valuable for a variety of purposes. The three highly reactive triple bonds permit use of these compounds as chemical intermediates. For example, the triorganoethynyl fluorosilanes may be hydrogenated to the corresponding olefinic or completely saturated materials. These novel compounds may also be subjected to other addition reactions with halogens or halogen acids. In such reactions the highly electronegative character of the fluorine atom would make these compounds selectively reactive, diminishing the number of undesirable side reactions which may occur. For instance, the carbon atom adjacent to the silicon atom would be electronegative so that in the addition of a hydrogen halide across the triple bond the positive hydrogen ion would tend to add at the electronegative carbon atom and the halide ion would tend to add at the other carbon atom, thereby decreasing the amount of undesirable isomers formed. In addition to the selective nature of the chemical reactivity of these fluorosilanes, their polymers, which may be prepared by free-radical polymerization techniques using, for example, peroxide and persulfate catalysts, would be, in view of the fluorine present, highly stable materials. Such polymers would be fire and explosion retardant, highly resistant to various solvents and possess high temperature stability, accordingly they may be used for a variety of surface treating purposes including waterproofing, and flame-retarding. Their high resistance to heat and oxidative degradation makes them desirable for protective coatings.

The new compounds of this invention may be obtained by inter-reacting an acetylenic Grignard reagent with silicon tetrafluoride. The reaction may be carried out at a temperature which may vary from about 15° C. to about 50° C., and at a pressure which may be atmospheric. Extreme temperatures and elevated pressures are not required. It has been found advantageous to employ a solvent for the Grignard reagent, such as diethyl ether, as the reaction medium. Small amounts of a cuprous salt, such as cuprous chloride, may be added to serve as a catalyst for the reaction. The reaction should preferably be performed under anhydrous conditions to prevent or inhibit undesirable side reactions. It is also desirable to agitate or mechanically mix the reagents immediately prior to and during the reaction to assure intimate reactive contact of the materials. Normally, the silicon tetrafluoride is bubbled through the reaction medium containing the acetylenic Grignard, the addition of silicon tetrafluoride being continued until only one liquid and one sold phase are present. After the reaction is completed, excess unreacted silicon tetrafluoride may be removed by purging with an inert gas such as argon or the like. The desired product can be recovered by filtering off any precipitated material, distilling the low boiling materials such as diethyl ether, and then recovering the high boiling materials at reduced pressure.

Silicon tetrafluoride, the reagent of this invention, may be prepared by any of the several known methods, for example by the inter-reaction of silica ($SiO_2$), granular sodium fluosilicate, and concentrated sulfuric acid. Care should preferably be taken to adequately purify the silicon tetrafluoride, since the presence of impurities may cause undesirable side reactions. It has been found that impurities may be removed by passing the silicon tetrafluoride through adsorption columns packed with an adsorbent material, e. g., glass wool, capable of removing impurities such as traces of hydrogen fluoride. An additional drying treatment to remove traces of moisture which may be present will also aid in reducing side reactions. Passing the silicon tetrafluoride through a drying tower packed wtih calcium chloride or other deliquescent material (a substance capable of adsorbing water) has been found satisfactory in this regard.

The acetylenic Grignard starting material, which may be represented by the formula $$R-C\equiv C-Mg-X$$

wherein R is a hydrocarbon radical and X is a halogen, may be prepared by reacting an acetylenic hydrocarbon, such as methyl acetylene, 1-hexyne, vinyl acetylene, phenyl acetlyene, depending upon the definition of R given above, with an alkyl magnesium halide, particularly methyl or ethyl magnesium bromide. It has been found advantageous to employ an excess of the acetylenic hydrocarbon in this reaction to ensure complete conversion to the acetylenic Grignard. A suitable inert organic solvent, such as diethyl ether is preferably employed as the reaction medium. The temperature may vary from room temperature to the reflux temperature of the inert organic solvent, about 35° C. in the case of diethyl ether. Elevated pressures are unnecessary. The reaction time will depend upon the quantity of the reactants and the reactivity of the particular acetylenic hydrocarbon employed.

The detailed practice of the invention is more fully illustrated by the following examples. These examples are merely representative and are not to be regarded as limitative of the scope of the invention in any way.

EXAMPLE 1

*Preparation of Tri-(1-propynyl) Fluorosilane, $(CH_3\equiv C)_3 SiF$*

The Grignard of methyl acetylene was prepared by bubbling methyl acetylene (approx. 1.5 moles) into a solution of 500 ml. of anhydrous diethyl ether containing 375 ml. of 4 molar methyl magnesium bromide (1.5 moles). The apparatus used for carrying out this reaction was a three-neck flask fitted with a stirrer, thermometer, gas addition tube, and water-cooled condenser which in turn was connected with a Dry Ice trap. The methylaceylene was added slowly over a period of 6 hours and 45 minutes at room temperature.

After preparation of the Grignard, the reactor is connected to the SiF₄ generator, said generator comprises a 2-liter round bottom reaction flask equipped with a stirrer, an Erlenmeyer flask connected to the reaction flask by means of large-diameter tubing, two columns packed with glass wool, and a drying tower packed with calcium chloride. The reaction flask is charged with 300 ml. of concentrated sulfuric acid and 180 grams (3.0 moles) of powdered silica ($SiO_2$). Granular sodium fluosilicate is contained in the Erlenmeyer flask and is added carefully to the reaction flask at such a rate that $SiF_4$ is generated steadily. Care must be exercised not to add too much of the fluosilicate at any one time because the stirred mixture might foam excessively. The silicon tetrafluoride generated is passed through two long columns packed with glass wool, a drying tower containing $CaCl_2$, and finally a safety tube before being introduced into the reaction flask containing the acetylenic Grignard as prepared above.

The silicon tetrafluoride is bubbled through the solution of acetylenic Grignard in diethyl ether at a rate of 100–200 cc./minute. The reaction mixture was stirred constantly to ensure homogeneity and adequate reactive contact. The addition was continued over a period of about 10 hours. The temperature was maintained between room temperature and reflux temperature. A white precipitate formed during the addition and a heavy viscous layer separated from the ether solvent. Gradually the heavy viscous layer disappeared and some more precipitate formed. After the reaction was completed, the resulting mixture was filtered off from the filtrate. The distillation residue contained some unreacted $SiF_4$ which was removed by purging with argon. Pure sodium fluoride was added to absorb any last traces of either $SiF_4$ or HF which may be present. The NaF was filtered off, and the dark liquid was dried over anhydrous $K_2CO_3$ and then redistilled under reduced pressure. The fraction distilling at 63–78.5° C. at 18 mm. was collected. Yield: 6.4 g. The material is a clear, colorless liquid with an odor like camphor.

Calculated for $(CH_3C\equiv C)_3 SiF$: C, 65.8; H, 8.3. Found: C, 65.26; H, 8.58.

EXAMPLE 2

*Preparation of Tri-(1-hexynyl) Fluorosilane,*
$(H_3C.CH_2.CH_2.CH_2.C\equiv C)_3 SiF$ The Grignard of 1-hexyne, i. e. 1-hexynyl magnesium bromide, was prepared by adding dropwise 82 g. (1 mole) of 1-hexyne to 230 ml. (1 mole) of 4 molar methyl magnesium bromide dissolved in 335 ml. of anhydrous diethyl ether in a three-necked flask equipped with a stirrer, thermometer, and dropping funnel, and water-cooled condenser. The addition of 1-hexyne was done slowly over a period of 65 minutes. The mixture was refluxed for 2 hours.

Silicon tetrafluoride was generated from 176 g. (4 moles) of NaF, 116 g. (2 moles) of $SiO_2$ and 400 ml. of concentrated $H_2SO_4$ by slowly adding the sulfuric acid to the mixture of NaF and $SiO_2$ while heating and stirring the mixture. The silicon tetrafluoride generated was bubbled through the acetylenic Grignard, prepared above, for a period of 265 minutes. As the reaction continued a white precipitate formed and the mixture warmed up slightly due to the heat of reaction. The mixture was then refluxed for 2 hours. After the reaction was completed, the reaction mixture was filtered. The white precipitate was soluble in water. The volatile diethyl ether was distilled off and the filtrate was further distilled under reduced pressure to remove any remaining ether and any unreacted 1-hexyne. The residue was a dark brown liquid containing a considerable amount of solid material. The liquid was decanted off and distilled. The following fractions were collected:

| | B. P./mm. Pressure, °C | Weight, g. |
| --- | --- | --- |
| Fraction I | 103–123 | 3.0 |
| Fraction II | 123–137 | 2.4 |
| Fraction III | 137–139 | 6.6 |
| Fraction IV | 139.5–141 | 6.7 |
| Fraction V | 141–144 | 6.7 |
| Fraction VI | 144–146.5 | 3.0 |

Fractions II, III, and V were combined, dissolved in 50 ml. of diethyl ether, washed with a 10 ml. portion of 10% NaOH and with 10 ml. of $H_2O$, and then dried over anhydrous $Na_2CO_3$. This purified material was labeled Fraction VII and submitted for analysis together with Fraction IV, above. The following analytical results were obtained:

Calculated for $(C_4H_9C\equiv C)SiF$: C, 74.4, H, 9,3; F, 6.5. Found for Fraction IV: C, 76.82; H, 9.61; F, 4.9,5.1. Found for Fraction VII: C, 74.98; H, 9.85; F, 4.3,4.1.

Fraction VII was also submitted for infra-red analysis which indicated the presence of (1) long chain alkyl groups, (2) —$C\equiv C$— group; and (3) SiF group, and therefore supports the postulated structure $(C_4H_9C\equiv)_3 SiF$ The conversion to trihexynyl fluorosilane based on 1-hexyne was 17.2%, the compound has a very light yellow color.

It will be readily understood by those skilled in the art to which the instant invention pertains that other triorganoethynyl fluorosilanes may be prepared in the same manner as described above except that other acetylenic hydrocarbons are used instead of methyl acetylene or 1-hexyne there employed for the preparation of the acetylenic Grignard. For example, phenyl acetylene may be reacted with methyl magnesium bromide and then interreacted with silicon tetrafluoride to form triphenylethynyl fluorosilane, $(C_6H_5C\equiv C)_3 SiF$; or, if vinylacetylene is used as the acetylenic hydrocarbon, tri-(3-butenynyl) fluorosilane, $H_2C=CHC\equiv C)_3SiF$, may be prepared.

What is claimed is:

1. A novel composition of matter represented by the formula $(R-C\equiv C)_3 SiF$ wherein R is a hydrocarbon radical selected from the group consisting of alkyl, alkenyl, aryl and aralkyl radicals.

2. A novel composition of matter represented by the formula $(R-C\equiv C)_3 SiF$ wherein R is an alkyl radical containing from 1 to 10 carbon atoms.

3. Tri-(1-hexynyl) fluorosilane.
4. Tri-(1-propynyl) fluorosilane.
5. Tri-(3-butenynyl) fluorosilane.
6. Triphenylethynyl fluorosilane.
7. The process of preparing a composition of matter represented by the formula $(R-C\equiv C)_3 SiF$ which comprises reacting silicon tetrafluoride with a Grignard reagent represented by the formula $R-C\equiv C-Mg-X$ wherein in each of the formulae R is a radical selected from the group consisting of alkyl, alkenyl, aryl, and aralkyl radicals, and X is a halogen.

8. The process of preparing a composition of matter represented by the formula $$(R—C≡C)_3SiF$$

which comprises reacting silicon tetrafluoride with a Grignard reagent represented by the formula $$R—C≡C—Mg—X$$

wherein in each of the formulae R is an alkyl radical containing from 1 to 10 carbons atoms, and X is a halogen.

9. The process for preparing tri-(1-hexynyl) fluorosilane which comprises reacting silicon tetrafluoride with 1-hexynyl magnesium bromide.

10. The process for preparing tri-(1-propynyl) fluorosilane which comprises reacting silicon tetrafluoride with 1-propynyl magnesium bromide.

11. The process for preparing tri-(3-butenynyl) fluorosilane which comprises reacting silicon tetrafluoride with vinyl acetylene magnesium bromide.

12. The process for preparing triphenylethynyl fluorosilane which comprises reacting silicon tetrafluoride with phenyl acetylene magnesium bromide.

13. The process of preparing a composition of matter represented by the formula $(R—C≡C)_3SiF$ which comprises reacting a purified silicon tetrafluoride with a Grignard reagent represented by the formula $$R—C≡C—Mg—X$$

wherein in each of the formulae R is a radical selected from the group consisting of alkyl, alkenyl, aryl, and aralkyl radicals, and X is a halogen.

14. The process of preparing a composition of matter represented by the formula $(R—C≡C)_3SiF$ which comprises reacting silicon tetrafluoride substantially free of hydrogen fluoride and moisture with a Grignard reagent represented by the formula $R—C≡C—Mg—X$, wherein in each of the formulae R is a radical selected from the group consisting of alkyl, alkenyl, aryl, and aralkyl radicals, and X is a halogen.

References Cited in the file of this patent

UNITED STATES PATENTS 2,671,101     Frisch ---------------- Mar. 2, 1954

OTHER REFERENCES

Gierut et al.: Jour. Am. Chem. Soc., vol. 58 (1936) pp. 897–898.

UNITED STATES PATENT OFFICE

CERTIFICATE OF CORRECTION

Patent No. 2,802,851                           August 13, 1957

George L. Moore

It is hereby certified that error appears in the printed specification of the above numbered patent requiring correction and that the said Letters Patent should read as corrected below.

Column 2, line 20, for "sold" read -- solid --; line 71, for "$(CH_3\equiv C)_3SiF$" read -- $(CH_3C\equiv C)_3$ SiF --; column 4, line 25, for "C, 74.4, H, 9,3;" read -- C, 74.4; H, 9.3; --; line 33, for "$(C_4H_9C\equiv)C_3SiF$" read -- $(C_4H_9C\equiv C)_3SiF$ --.

Signed and sealed this 3rd day of December 1957.

(SEAL)
Attest:
KARL H. AXLINE
Attesting Officer

ROBERT C. WATSON
Commissioner of Patents